United States Patent [19]

Peachee, Jr.

[11] 4,209,722
[45] Jun. 24, 1980

[54] DIE CAST ROTOR WITH CAST-IN-PLACE OIL RETURN MEMBER

[75] Inventor: C. Theodore Peachee, Jr., Maryland Heights, Mo.

[73] Assignee: Emerson Electric Co., St. Louis, Mo.

[21] Appl. No.: 944,393

[22] Filed: Sep. 21, 1978

[51] Int. Cl.² ............................................. H02K 7/08
[52] U.S. Cl. ...................................... 310/90; 310/211; 310/42
[58] Field of Search .................... 310/42, 90, 211, 261

[56] References Cited

U.S. PATENT DOCUMENTS

| 2,524,555 | 10/1950 | Willits | 310/90 |
| 3,121,179 | 2/1964 | Macks | 310/90 |
| 3,420,335 | 1/1969 | Dochterman | 310/90 X |
| 3,486,050 | 12/1969 | Dederick | 310/90 |
| 4,045,698 | 8/1977 | Morrill | 310/90 X |

FOREIGN PATENT DOCUMENTS 2502778  7/1975  Fed. Rep. of Germany ............ 310/90

Primary Examiner—Mark O. Budd
Attorney, Agent, or Firm—Polster, Polster and Lucchesi

[57] ABSTRACT

A die cast rotor for an electric motor in which a tubular oil return member is sealingly cast-in-place within the body of the rotor.

5 Claims, 3 Drawing Figures

DIE CAST ROTOR WITH CAST-IN-PLACE OIL RETURN MEMBER

BACKGROUND OF THE INVENTION

This invention relates to a rotor assembly for an electric motor or the like, and more particularly to a die cast, squirrel cage rotor having a tubular oil return member sealingly cast-in-place within the rotor.

In certain dynamoelectric machines of the inductive motor type, and particularly in many smaller motors sometimes referred to as unit bearing motors, the motors have a squirrel cage rotor assembly in which the conductor bars for the rotor and the body of the rotor are made of die cast aluminum. Typically, these rotor assemblies include a stack of individual laminations constructed from suitable magnetic material. Each lamination has a central opening and a plurality of so-called satellite openings adjacent their outer margins. The laminations are assembled in a stack and the laminations are rotated slightly with respect to one another in the stack so that their central openings are coaxial but so that their satellite openings are skewed relative to one another and so that the satellite openings constitute slots. The lamination stack is then placed in a suitable die casting mold and molten aluminum is injected under pressure into the mold so as to surround the lamination stack, to fill the mold, and to flow through the skewed slots in the lamination stack formed by the satellite openings so as to form the conductor bars of the rotor. These die cast squirrel cage rotors typically have a central opening therethrough and a rotor shaft extending through this opening which is rigidly secured to the rotor so that the shaft rotates with the motor. This central opening may be defined at least in part by the central opening of the laminations and is appreciably larger than the shaft so as to receive a rigid boss of the motor housing. The rotor shaft is received in an opening in the boss and is journalled therein by a suitable journal bearing or the like so as to rotatably support the rotor on the motor housing. As is typical, a portion of the rotor shaft journalled in the bearing has a helical oil groove formed on its outer surface and the outer end of the shaft rotates in a felt wick supplied with lubricating oil from a reservoir. Upon rotation of the rotor, the oil grooves in the shaft pick up oil from the wick and move it along the length of the bearing to lubricate it. Upon the oil being discharged from the inner end of the bearing, it is slung outwardly by the centrifugal force of the rotating rotor shaft.

In prior art motors having such rotors, a return system was provided for recirculating the oil back to the oil supply reservoir. This oil return system typically included a tubular oil return member which was fitted into the opening in the rotor after die casting. This oil return member surrounded the bearing boss and extended out beyond the end of the rotor. The inner end of this oil return member was sealed to the rotor body by application of a sealant. An outer end cap carried by the motor housing surrounded the outer end of the oil return member and collected oil which flowed out the end of the oil return member from the inside of the rotor.

In the manufacture of these prior die cast squirrel cage rotors, it has heretofore been difficult to fit the oil return member into the rotor body and to seal the inner end of the oil return member to the rotor body. As mentioned above, the sealing operation usually involved the application of a sealant to the joint between the inner end of the oil return member and the rotor body. However, many of the motors which incorporated these die cast squirrel cage rotors were relatively small and the space in which the sealant had to be applied was cramped. Also, the application of sealant was a messy and time consuming operation performed after die casting of the rotor thus resulting in increased labor costs for the manufacture of the motor.

SUMMARY OF THE INVENTION

Among the several objects and features of this invention may be noted the provision of a die cast squirrel cage rotor, such as above-described, in which a tubular oil return member is sealably cast-in-place in the rotor body;

The provision of such a rotor which is appreciably faster and easier to manufacture;

The provision of such a rotor which eliminates the requirement of applying a sealant to the oil return member for sealing its inner end with respect to the rotor body;

The provision of such a rotor in which the oil return member serves as a portion of the mold for forming a portion of the rotor body during die casting; and The provision of such a rotor which is economical to manufacture and which is reliable in operation.

Briefly, a die cast rotor of this invention for use in an electric motor or the like comprises a rotor body of die cast metal. The body has a longitudinal central axis about which the rotor is rotatable, and a longitudinal central opening substantially coaxial with this central axis. A non-integral tubular oil return member defines the inner surface of a portion of the central opening of the rotor body. This tubular oil return member has an inner end which is cast-in-place within the die cast rotor body thereby to sealably secure the oil return member to the rotor body and to thus prevent leakage of oil between the inner end of the oil return member and the rotor body. Other objects and features of this invention will be in part apparent and in part pointed out hereinafter.

BRIEF DESCRIPTION OF THE DRAWINGS

Corresponding reference characters indicate corresponding parts throughout the several views of the drawings.

DESCRIPTION OF A PREFERRED EMBODIMENT

Figure 1:
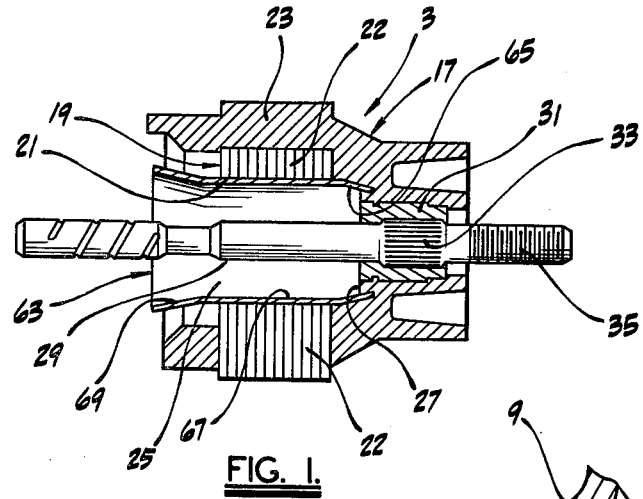
FIG. 1 is a longitudinal cross sectional view of a die cast squirrel-cage rotor of this invention having an oil return member cast-in-place therein and having a rotor shaft affixed thereto.

Referring now to the drawings a squirrel cage electric motor, as indicated in its entirety at 1, is shown to include a die cast rotor 3 of this invention mounted for rotation within a stator assembly 5. More specifically, motor 1 is a so-called unit bearing motor and it includes a motor housing 7 including a rigid, cast body 9 and a cover 11 sealably secured to the body. Stator assembly 5 is shown to include a stack S of steel or soft iron lamination plates 13 each having slots (not shown) formed therein for reception of coils of wire, as shown in phantom and as indicated at reference character 15, constituting the windings of the stator.

Rotor 3 of this invention is preferably a die cast squirrel cage rotor having a body 17 of die cast aluminum or other suitable electrically conductive material. Cast-in-place within body 17 is a stack of laminations, as indicated at 19. As is typical, each of these laminations has a central opening 21 and a plurality of so-called satellite openings 22 adjacent their outer margins. As is typical, the lamination plates are rotated relative to one another in the stack so that their satellite openings form skewed slots. With the lamination plates assembled in a stack, with the central openings of the lamination plates coaxial, and with each of the plates being rotated relative to the adjacent plates in the stack, the satellite openings form skewed slots. The stack of laminations is positioned in a die casting mold (not shown), and molten aluminum is forced into the mold under pressure so as to surround the stack and to fill the mold so as to form the rotor body. Additionally, the molten aluminum fills the slots in the lamination stack so as to form rotor conductor bars 23. These rotor conductor bars are integral with other portions of the rotor body at the ends of the lamination stack and these last-mentioned portions constitute end rings for the rotor.

Figure 2:
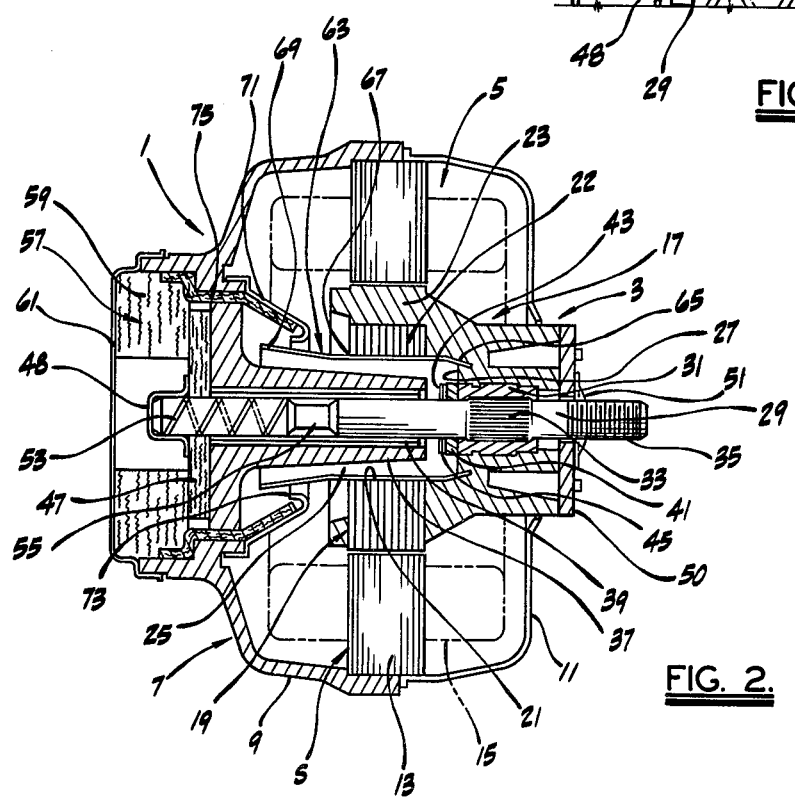
FIG. 2 is a longitudinal cross sectional view of a so-called unit bearing electric motor having a rotor of this invention installed therein.

Rotor 3 further has a longitudinal central opening 25 extending therethrough. Central opening 21 of lamination stack 19 constitutes a portion of rotor body central opening 25. As indicated at 27, rotor body 17 has a shoulder projecting inwardly into central opening 25. The portion of opening 25 extending through the shoulder is shown to be of smaller diameter than the remainder of the opening. A rotor shaft 29 having an insert 31 affixed thereto is fitted into the portion of opening 25 through shoulder 27. Insert 31 is locked to rotor body 17 and shaft 29 is knurled, as indicated at 33, so as to lock the shaft to the insert. In this manner, rotation of the rotor with the shaft is insured. Shaft 29 is shown to extend out beyond both ends of the rotor. As shown in FIGS. 1 and 2, the right end of the shaft is threaded, as indicated at 35, for attachment of a fan or the like, and the left end of the shaft is adapted to be received in a bearing for journalling the rotor for rotation about the longitudinal axis of the shaft. More particularly, motor body 9 has a central bearing boss 37 extending inwardly into the motor. Boss 37 has a bushing 39 or journal bearing therein for reception of shaft 29 so as to journal the rotor on the motor housing. Boss 37 is rigid and thus serves as a support for the rotor. Since motor 1 has only a single bearing, it is referred to as a unit bearing motor.

As indicated at 41, a nylon spacer washer surrounds shaft 29 and abuts insert 31. A thrust washer 43 also surrounds the shaft and faces toward the inner end of boss 37, and a cushion washer 45 of rubber or the like is disposed between the spacer washer and the thrust washer. A washer 47 of suitable wick material surrounds the outer end of shaft 29 and bears against the outside of body 9. A push nut 48 is applied to the outer end of shaft 29 with a thrust washer 49 (see FIG. 2) disposed between the push nut and wick washer. Thus, push nut 48 securely holds rotor 3 within body 9. A hub washer 50 covers one end (i.e., the right end) of rotor body 17. This hub washer is shown to be secured in place by a speed nut 51 threaded on shaft 29.

Shaft 29 has a helical oil groove 53 formed thereon and is undercut, as indicated at 55. A lubricating oil reservoir, as generally indicated at 57, is provided on the motor for supplying lubricating oil to shaft 29 for lubrication of the journal bearing or bushing 39. This oil reservoir is shown to comprise a storage wick 59 held in place on body 9 by means of a cap 61. Storage wick 59 holds a quantity of oil and is in lubricating communication with washer wick 47 for feeding oil thereto. Wick washer 47 is in engagement with shaft 29 which passes therethrough and feeds oil onto the shaft. Oil grooves 53 on the shaft pick up oil from wick washer 47 and feed it along the length of the shaft for lubricating bearing 39 when the shaft is rotated. Oil fills the undercut portion 55 of the shaft and is forced over the remainder of the length of the shaft upon additional oil being forced into the undercut area by the oil groove. As oil is forced out of the inner end of bushing 39, it is flung outwardly by the centrifugal force of the rotating rotor shaft.

Figure 3:
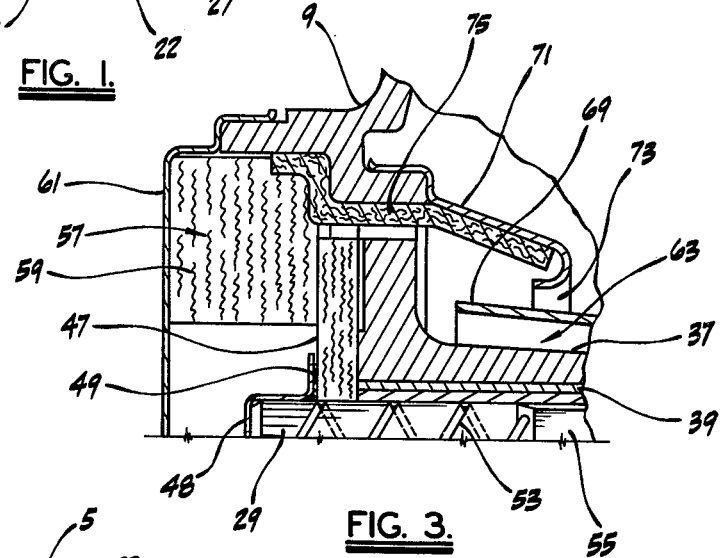
FIG. 3 is an enlarged cross sectional view of a portion of the motor shown in FIG. 2.

In accordance with this invention, a non-integral tubular oil return member, as generally indicated at 63, is sealably cast-in-place within rotor body 17 so as to catch the oil flung from shaft 29 and to return it to oil supply wick 59. More specifically, oil return member 63 is shown to be made of aluminum tubing or the like and to have an inwardly tapered inner end 65, a cylindric main body portion 67, and an outwardly flared end 69. As best shown in FIG. 3, the oil return member is coaxial with the longitudinal axis of shaft 29 and is adapted to receive boss 37 with the inside diameter of the oil return member being somewhat larger than the outside diameter of the boss. The flared end 69 of the oil return member is shown to extend out beyond the rotor body a considerable distance.

As is conventional, motor 1 includes and end cap 71 secured to body 9. This end cap is formed of sheet metal or the like in the form of a truncated cone with its smaller end having an opening therethrough defined by an inwardly curled lip 73. This opening receives the outer flared end 69 of oil return member 63 and the inner surface of lip 73 is spaced from the outer surface of the oil return member. An oil return wick 75 extends through body 9 so as to pick up oil which flows outwardly along the inside of the oil return member and which is flung outwardly from the open end of the latter as the rotor rotates and is caught by end cap 71. The oil picked up by the return wick flows back to supply wick 59. Lip 73 prevents oil from escaping from the end cap into the motor.

As mentioned above, inner end 65 of oil return member 63 is cast-in-place within rotor body 17. More specifically, it is cast into shoulder 27 of the rotor body. As noted above, the inner end of the oil return member is tapered inwardly. Thus, after it has been cast-in-place within the die cast rotor body, solid metal (e.g., die cast aluminum) surrounds the inner end of the tubular oil return member thereby to mechanically interlock the oil return member relative to the rotor body. Of course, during die casting, the molten metal makes a tight, sealing fit with the inner end of the tubular oil return member thus sealing it with respect to the rotor body and preventing the leakage of oil past this cast-in-place joint between the tubular member and the rotor body. This sealed, cast-in-place joint thus eliminates the requirement of having to seal the joint with a suitable sealant material in a post-die casting manufacturing operation.

In the manufacture of rotor 3 of this invention, lamination stack 19 is placed within a suitable die casting mold (not shown) and oil return member 63 is inserted through central opening 21 of the lamination stack until its inner end 65 is positioned relative to the laminations as shown in FIG. 1. Thus, the laminations hold the oil return member in place with the die casting mold. An insert core (not shown) is inserted into the oil return member forming an inner end mold face for forming shoulder 27 of the rotor body and forming the inner face of the portion of central opening 25 extending through the shoulder. It will be particularly noted that oil return member 63 constitutes an inner mold surface for forming at least a portion of central opening 25 in rotor 3. Molten metal (e.g., aluminum) is then forced into the mold so as to form rotor body 17, to cast the lamination stack in place, to cast oil return member 63 in place, and to form the end rings and the conductor bars of the rotor.

In view of the above, it will be seen that the several objects of the invention are achieved and other advantageous results attained.

As various changes could be made in the above constructions without departing from the scope of the invention, it is intended that all matter contained in the above desciption or shown in the accompanying drawings shall be interpreted as illustrative and not in a limiting sense.

What is claimed is:

1. A die cast rotor for an electric motor or the like, said rotor having a rotor body of die cast metal, said body having a longitudinal central axis about which said rotor is rotatable, and a longitudinal central opening substantially coaxial with said central axis, a non-integral tubular oil return member defining the inner surface of a portion of said central opening, said tubular oil return member having an inner end, said die cast rotor body surrounds said inner end of said oil return member and engages both the inside and outside surfaces thereof so as to sealably secure said tubular oil return member to said rotor body and to prevent the leakage of oil between said inner end of said oil return member and said rotor body.

2. A rotor as set forth in claim 1 wherein said inner end of said oil return member tapers inwardly toward said central axis.

3. A rotor as set forth in claim 1 wherein said tubular oil return member has an outer surface which at least in part is directly engageable with said die cast rotor body so as to constitute a mold surface for said rotor body during die casting of said rotor.

4. A rotor as set forth in claim 1 further comprising a stack of lamination plates, said stack having a central opening coaxial with respect to the above-said central opening of said rotor, said oil return member being fitted in said central opening of said stack to hold said oil return member in position for being cast-in-place within said rotor body.

5. A rotor as set forth in claim 1 wherein said tubular oil return member has an end which extends out beyond one end of said rotor body.

* * * * *